United States Patent
Batchelor et al.

(10) Patent No.: US 10,528,412 B2
(45) Date of Patent: *Jan. 7, 2020

(54) MULTIPLE PATH ERROR DATA COLLECTION IN A STORAGE MANAGEMENT SYSTEM

(71) Applicant: INTERNATIONAL BUSINESS MACHINES CORPORATION, Armonk, NY (US)

(72) Inventors: Gary W. Batchelor, Tucson, AZ (US); Matthew D. Carson, Encino, CA (US); Enrique Q. Garcia, Tucson, AZ (US); Larry Juarez, Tucson, AZ (US); Jay T. Kirch, Tucson, AZ (US); Tony Leung, San Jose, CA (US); Trung N. Nguyen, Vail, AZ (US); Brian A. Rinaldi, Tucson, AZ (US); Todd C. Sorenson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/805,045

(22) Filed: Nov. 6, 2017

(65) Prior Publication Data
US 2018/0060158 A1   Mar. 1, 2018

Related U.S. Application Data

(63) Continuation of application No. 14/939,777, filed on Nov. 12, 2015, now Pat. No. 9,842,016.

(51) Int. Cl.
| | |
|---|---|
| *G06F 11/00* | (2006.01) |
| *G06F 11/07* | (2006.01) |
| *G06F 3/06* | (2006.01) |
| *G06F 11/18* | (2006.01) |

(52) U.S. Cl.
CPC ............ *G06F 11/0778* (2013.01); *G06F 3/06* (2013.01); *G06F 11/0727* (2013.01);
(Continued)

(58) Field of Classification Search
CPC ............ G06F 11/0778; G06F 11/0727; G06F 11/0745; G06F 11/0751; G06F 11/0766; G06F 11/18; G06F 3/06
See application file for complete search history.

(56) References Cited

U.S. PATENT DOCUMENTS

| | | |
|---|---|---|
| 6,871,299 B2 | 3/2005 | Havekost et al. |
| 7,290,180 B2 | 10/2007 | Duron et al. |

(Continued)

FOREIGN PATENT DOCUMENTS

DE    3829739 A1    3/1989

OTHER PUBLICATIONS

RS-485, Wikipedia, pp. 6, [online][retrieved Oct. 22, 2015] https://en.wikipedia.org/wiki/RS-485.

(Continued)

*Primary Examiner* — Marc Duncan
(74) *Attorney, Agent, or Firm* — William K. Konrad; Konrad Raynes Davda & Victor LLP

(57) ABSTRACT

In one aspect, multiple data path error collection is provided in a storage management system. In one embodiment, an error condition in a main data path between the storage controller and at least one of a host and a storage unit is detected, and in response, a sequence of error data collection operations to collect error data through a main path is initiated. In response to a failure to collect error data at a level of the sequential error data collection operations, error data is collected through an alternate data path as a function of the error data collection level at which the failure occurred. Other aspects are described.

21 Claims, 8 Drawing Sheets

(52) U.S. Cl.
CPC ...... *G06F 11/0745* (2013.01); *G06F 11/0751* (2013.01); *G06F 11/18* (2013.01)

(56) References Cited

U.S. PATENT DOCUMENTS

| | | | |
|---|---|---|---|
| 7,908,523 | B1 | 3/2011 | Aiello et al. |
| 8,082,466 | B2 | 12/2011 | Tanaka et al. |
| 9,037,920 | B2 | 5/2015 | Bell et al. |
| 9,086,919 | B2 | 7/2015 | Iyer et al. |
| 9,842,016 | B2 * | 12/2017 | Batchelor ........... G06F 11/0778 |
| 2005/0144533 | A1 | 6/2005 | LeVangia et al. |
| 2011/0283037 | A1 | 11/2011 | Koga et al. |
| 2017/0103029 | A1 * | 4/2017 | Ware .................. G06F 13/1684 |
| 2017/0139764 | A1 | 5/2017 | Batchelor et al. |

OTHER PUBLICATIONS

"PCI Express", Wikipedia, pp. 22, [online][retrieved Oct. 22, 2015] https://en.wikipedia.org/wiki/PCI_Express.
VOKER_Redundancy_Arrangement_For_Information_Transfer, pp. 6.
U.S. Appl. No. 14/939,777, filed Nov. 12, 2015.
Office Action dated Apr. 3, 2017, pp. 10 for U.S. Appl. No. 14/939,777, filed Nov. 12, 2015.
Response dated Jul. 3, 2017, pp. 11 to Office Action dated Apr. 3, 2017, pp. 10 for U.S. Appl. No. 14/939,777, filed Nov. 12, 2015.
Notice of Allowance dated Aug. 4, 2017, pp. 5 for U.S. Appl. No. 14/939,777, filed Nov. 12, 2015.
List of IBM Patents or Patent Applications Treated as Related, dated Nov. 6, 2017, pp. 2.

* cited by examiner

MULTIPLE PATH ERROR DATA COLLECTION IN A STORAGE MANAGEMENT SYSTEM

BACKGROUND OF THE INVENTION

1. Field of the Invention

The present invention relates to a computer program product, system, and method having data paths for system component management in a storage management system.

2. Description of the Related Art

In a storage system or environment, a storage controller of a server, typically receives input/output (I/O) instructions from a host to write data to or read data from data storage units controlled by the storage controller. The hosts and the storage controller frequently communicate with each other through host adapters through which signal paths between the various hosts and the storage controller pass. A connection fabric often provides the connections between the storage controller and the host adapters.

In a similar manner, the storage units and the storage controller of the storage system frequently communicate with each other through device adapters through which signal paths between the various storage units and the storage controller pass. Here too, a connection fabric often provides the connections between the storage controller and the storage units.

One example of a data path through a connection fabric is a data path which operates in compliance with the Peripheral Component Interface Express (PCIe) protocol. A PCIe data path can frequently provide high speed data transfer rates which are sufficient to support commercial scale data storage operations. In the event that a PCIe data path fails, some storage systems provide redundant PCIe data paths including redundant host adapters, redundant device adapters and other redundant components to provide complete redundant PCIe data paths over which high speed data storage operations between the hosts and storage units may be resumed. In addition, the redundant PCIe data paths can facilitate error data collection to diagnose the cause of the error condition in the data path.

However, the components of such redundant PCIe data paths can significantly increase the cost or complexity of a data storage system. Accordingly, some storage systems may lack redundant PCIe data paths. As a result, in the event of a hardware or software failure in one or more components of the PCIe data paths, both high speed data operations and error data collection for error diagnosis purposes may be fully or partially hindered.

SUMMARY

In one aspect of the present description, main data paths are provided for error data collection in a sequence of hierarchical error data collection operations arranged in a hierarchy of error data collection levels, and in the event of a failure of an error data collection operation over the main data paths, alternate data paths are provided for collecting error data through an alternate data path as a function of the level at which a failure to collect error data over a main data path occurred. As a result, error data to be collected may be determined as a function of the level at which the error data collection failure occurred. As a consequence, the amount of error data to be collected may be reduced, facilitating the use of less expensive, lower bandwidth alternate data paths.

In one embodiment, an error condition in a main data path between a storage controller and at least one of a host and a storage unit may be detected, and in response, a sequence of error data collection operations to attempt to collect error data over the main data paths may be initiated. In response to a failure to collect error data at a level of the sequential error data collection operations, error data through an alternate data path may be identified and collected as a function of the error data collection level at which the failure to collect error data over a main data path occurred. As a result, efficiency of error data collection operations may be increased in some embodiments.

In another aspect, the main data paths may be arranged in a hierarchy of data path levels, each hierarchical data path level including a data path node having a data path node device configured to store error data associated with the detected error condition. Alternate data paths are provided to couple the storage controller to the data path node devices of hierarchical data path levels. The selection of error data to be collected over the alternate data paths may include determining which data path node device to collect error data from as a function of the error data collection level at which the main data path error data collection failure occurred.

In another aspect of the present description, each level of the sequence of hierarchical error data collection operations is associated with a hierarchical data path level, and wherein the collecting error data through an alternate data path as a function of the error data collection level at which the failure occurred, includes collecting error data stored in the data path node device of the data path node of the hierarchical data path level associated with the level of the sequence of hierarchical error data collection operations at which the failure occurred. Other aspects are described.

DETAILED DESCRIPTION

One aspect of the present description provides multiple path error data collection in a storage management system. As explained in greater detail below, such multiple path error data collection can facilitate data path error diagnosis and correction without incurring the expense and complexity of redundant high speed data paths.

For example, in one embodiment, an error condition in a main data path such as a PCIe data path, for example, between a storage controller and a host and a storage unit, may be detected. In response, sequential error data collection may be initiated through the main data paths. In one embodiment, the sequential error data collection in includes a sequence of error data collection operations at various hierarchical levels.

In response to a failure to collect error data at a hierarchical level of the sequence of error data collection operations, error data may be collected through an alternate data path as a function of the particular hierarchical level at which the sequential error data collection failed. For example, the error data collection may be restricted to collection of error data from devices associated with the particular hierarchical level at which the sequential error data collection failed. Conversely, error collection from devices within the same data path but not associated with the particular hierarchical level at which the sequential error data collection failed, may be bypassed. As a result, in some applications, error collection may be focused to a relatively small number of devices. Consequently, the alternate data path may have a relatively low speed data transfer rate such as that of the RS 485 protocol, for example, which may frequently be implemented at much lower cost as compared to high speed, high volume, data transfer protocols such as the PCIe protocol.

In one embodiment, a main data path includes a plurality of hierarchical data path nodes and links arranged in a hierarchy of data path levels. Each hierarchical data path node may include a data path node device configured to store error data associated with a data transmission error occurring in association with the particular hierarchical data path level. Further, each hierarchical error data collection level of the sequence of error data collection operations is associated with a hierarchical data path level of the data path nodes and links. Each such sequential error data collection level includes collecting error data stored in a data path node device of a hierarchical data path level associated with the sequential error data collection level of the sequence of error data collection levels. In this manner, in response to a failure to collect error data through the main data path at a particular level of the sequence of error data collection operations, error data may be collected through an alternate data path as a function of the particular error data collection level at which the sequential error data collection operation failed.

Figure 1:
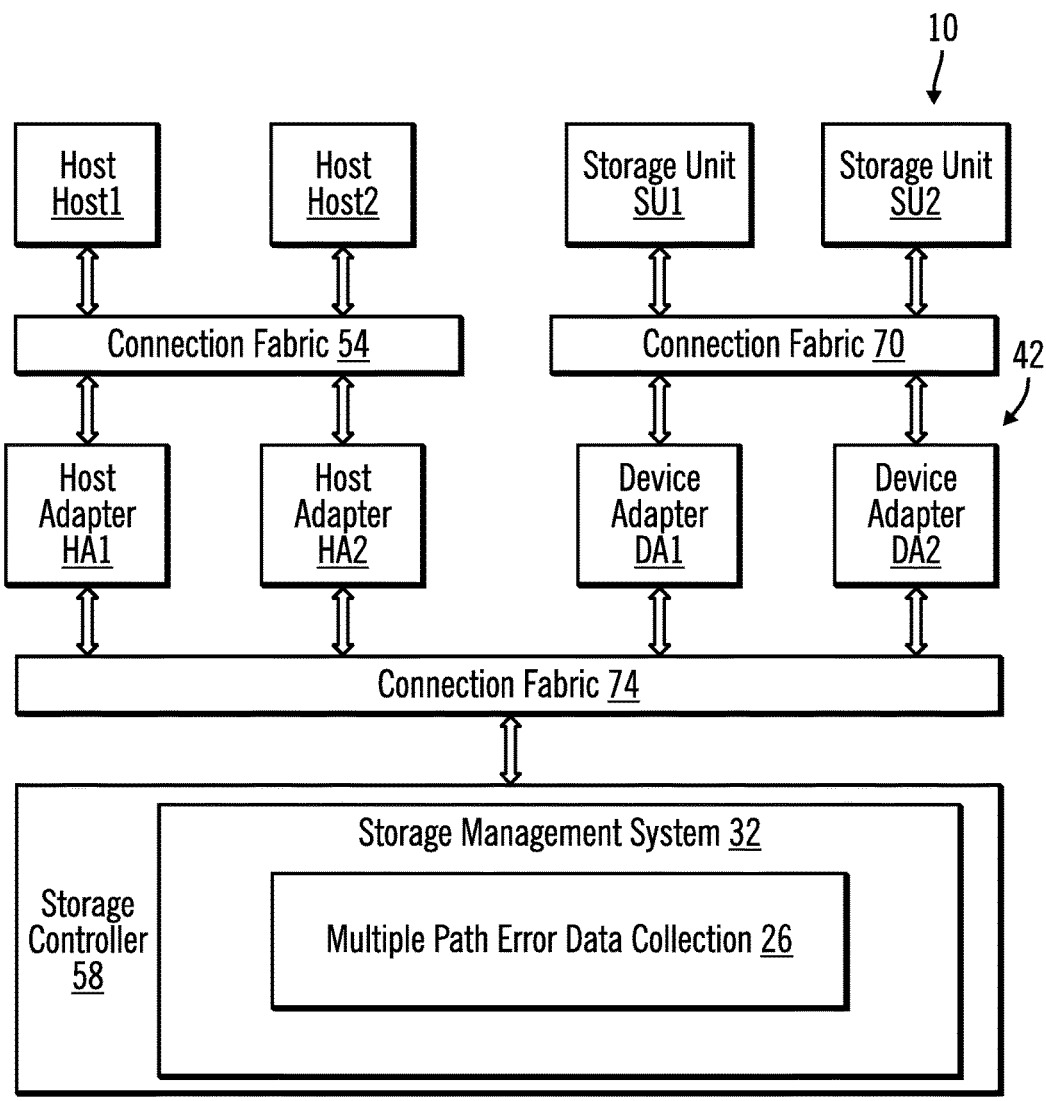
FIG. 1 illustrates an embodiment of a computing system having a storage management system employing multiple path error data collection in accordance with the present description.

FIG. 1 illustrates one embodiment of a storage system or environment 10 employing multiple path error data collection 26 in a storage management system 32 in accordance with the present description. As explained in greater detail below, multiple path error data collection may be employed to facilitate error data collection and correction for errors occurring in data paths between the components of the storage system 10. For example, the system 10 (FIG. 1) includes a server 42 and a plurality of hosts as represented by the hosts, host1, host2, etc. Although the drawing of FIG. 1 depicts two such hosts for simplicity sake, it is appreciated that a storage environment may have a fewer or greater number of hosts, depending upon the particular application.

The server 42 may comprise a modified version of an enterprise storage controller/server suitable for managing access to attached storage devices, such as, but not limited to, the International Business Machine Corporation's ("IBM") DS8000® storage system or other vendor servers known in the art. (DS8000 is a registered trademark of IBM in countries throughout the world). The server 42 is modified to provide a storage management system employing multiple path error data collection in accordance with the present description.

A connection fabric 54 interconnects specific hosts to specific host adapters, HA1, HA2, etc., of the server 42, which have been assigned to the specific hosts, Thus, host adapter HA1 may be assigned to host1 and host adapter HA2 may be assigned to host2, for example. The connection fabric 54 includes various connection devices for connecting each host adapter to its assigned host so that there is a signal path connecting a host adapter to its assigned host.

Similarly, a connection fabric 70 interconnects specific storage units SU1, SU2 to specific device adapters, DA1, DA2, etc., of the server 42, which have been assigned to the specific storage units, Thus, device adapter DA1 may be assigned to storage unit SU1 and device adapter DA2 may be assigned to storage unit SU2, for example. The connection fabric 70 includes various connection devices for connecting each device adapter to its assigned storage unit so that there is a signal path connecting a device adapter to its assigned storage units. Such connection devices of the connection fabrics 54, 70 may include cables including wire or fiber optic cables, switches, wireless transmitters and receivers, busses, networks, routers etc., depending upon the particular application. A signal path between a host adapter and its assigned host, or a signal path between a device adapter and its assigned storage unit, is typically achieved by configuring appropriate connection devices. Such configuration may be done physically or through appropriate software, depending upon the particular application.

It is appreciated that a host may be assigned to more than one host adapter and in some applications, a host adapter may be assigned to more than one host. One example of a host adapter is a PCIe host adapter. It is appreciated that other types of host adapters may be utilized, depending upon the particular application.

Similarly, it is appreciated that a storage unit may be assigned to more than one device adapter and in some applications, a device adapter may be assigned to more than one storage unit. One example of a device adapter is a PCIe device adapter. It is appreciated that other types of device adapters may be utilized, depending upon the particular application.

The server 42 includes a storage controller 58 which controls one or more data storage units SU1, SU2, etc., such as disk drives, tape storage, solid state memory, etc., a As explained in greater detail below, the storage controller 58 includes the storage management system 32 employing an embodiment of multiple path error data collection 26 in accordance with the present description. The storage management system 32 provides for configuring and administering the storage controller 58 and the storage units SU1, SUB2. Data is stored within a data storage unit as units of data which may be storage volumes, for example. Storage volumes may be grouped and managed together in a storage volume group. Other examples of units of data stored within a data storage unit are tracks, cylinders, allocation units, extents, etc.

A connection fabric 74 interconnects storage controller 58 to the host adapters HA1, HA2 so that there are signal paths connecting the storage controller to each of the hosts via the host adapters HA1, HA2. The connection fabric 74 also interconnects storage controller 58 to the device adapters DA adapters DA1, DA2 so that there are signal paths connecting the storage controller to each of the storage units via the device adapters DA1, DA2. The connection fabric 74, like the connection fabrics 54, 70, includes various connection devices for connecting the storage controller to each host adapter HA1, HA2, and to each device adapter DA1, DA2. Such connection devices again, may include cables including wire or fiber optic cables, switches, wireless transmitters and receivers, busses, networks, routers etc., depending upon the particular application. A signal path between the storage controller and a host port or storage volume is typically achieved by configuring appropriate connection devices. Such configuration may be done physically or through appropriate software, depending upon the particular application. The connection devices may operate and may be physically configured in accordance with a suitable data transmission protocol such as the PCIe protocol. As explained in greater detail below, in addition to a main data path such as a PCIe data path for high speed, high volume input/output operations, the connection fabric 74 also includes a secondary, alternate data path such as an RS 485 lower speed, lower volume data path for multiple data path error data collection in accordance with the present description.

One or more of the connection fabrics 54, 70, 74 may comprise a bus, Storage Area Network (SAN), Local Area Network (LAN), Intranet, the Internet, Wide Area Network (WAN), peer-to-peer network, wireless network, arbitrated loop network, etc. The storage volumes are stored in storage units which may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices may comprise hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Although a certain number of instances of elements, are shown, there may be any number of these components.

Figure 2:
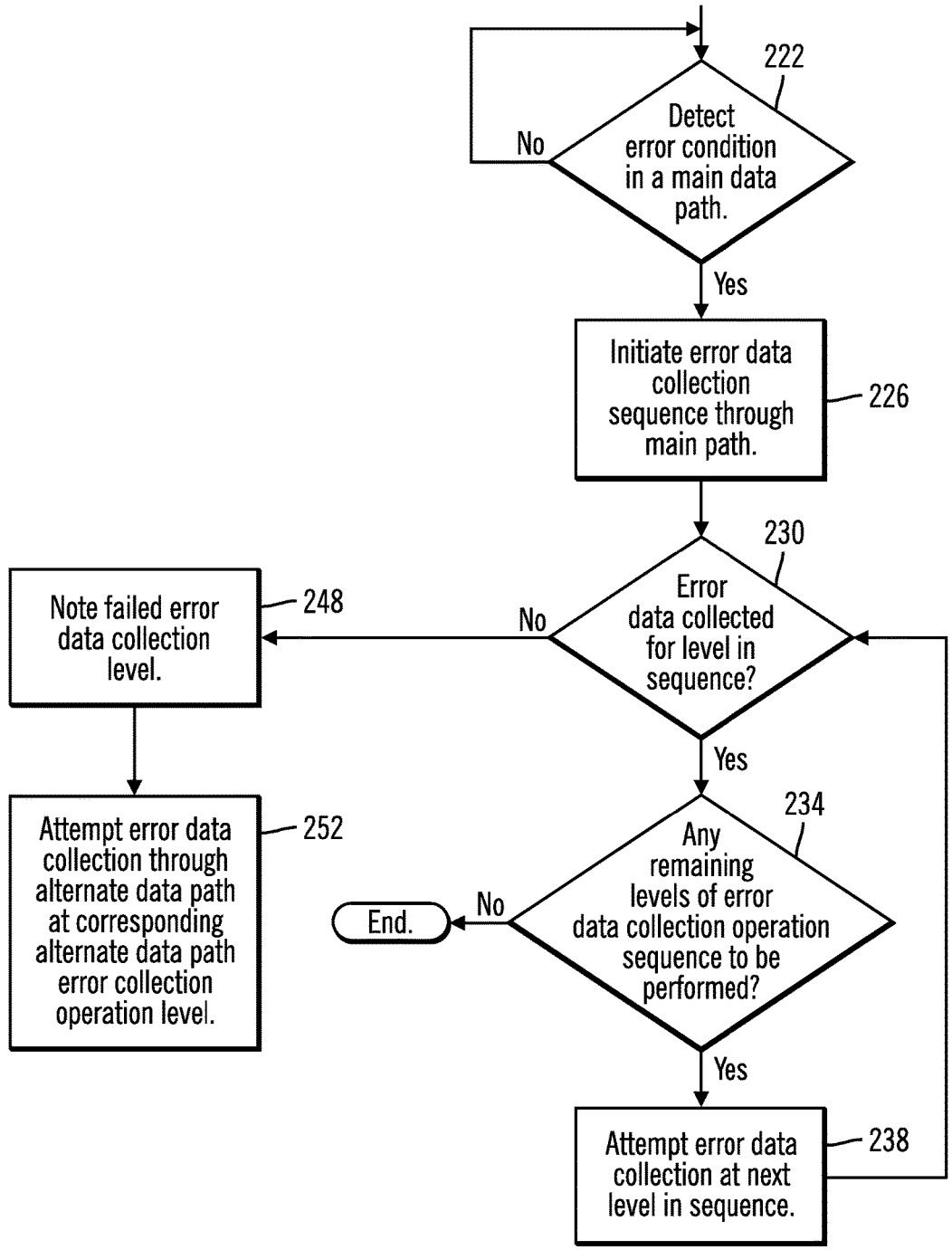
FIG. 2 depicts an embodiment of operations of the storage management system of FIG. 1, employing multiple path error data collection in accordance with the present description.

FIG. 2 depicts an example of operations of multiple data path error data collection of a storage management system, in accordance with the present description. The system management operations depicted in FIG. 2 may be performed by at least one or more of hardware, software, or firmware alone or in combination. In one embodiment, the multiple data path error data collection 26 (FIG. 1) of the storage management system 32 is implemented as a part of the storage controller 58. It is appreciated that one or more of the operations of the system management may be performed in whole or in part, in other devices such as one or more of the hosts, depending upon the particular application.

In one operation, an error condition in a main data path is detected (block 222). In the illustrated embodiment, the main data path is a PCIe data path in the connection fabric 74 (FIG. 1) interconnecting the storage controller 58 to a connection device such as one of the host adapters HA1, HA2, or to one of the device adapters DA1, DA2, for example. One example of such an error condition may be a hardware error condition such as a physical disconnect or malfunction of a hardware component of the PCIe data path or may be a software error condition such as a recursive fabric error on a PCIe link of the data path which renders the PCIe data path degraded or useless. It is appreciated that multiple data path error data collection in accordance with the present description may be applied to other types of error conditions, depending upon the particular application.

In response to the detection (block 222) of the error condition in the main data path, a sequence of hierarchical main data path error data collection operations is initiated (block 226). The hierarchical error data collection operations are arranged in a hierarchy of error data collection levels. As described below, the error data collection operations are sequentially attempted and a determination (block 230) is made as to whether each sequential attempt is successful.

In one embodiment, each main data path error data collection operation of the sequence of main data path error data collection operations is at a hierarchical error data collection level associated with particular hierarchical data path nodes and links arranged in a hierarchy of data path levels. Each main data path error data collection operation targets a particular main data path device such as a node or link device of a hierarchical data path level to collect the error data.

Figure 3:
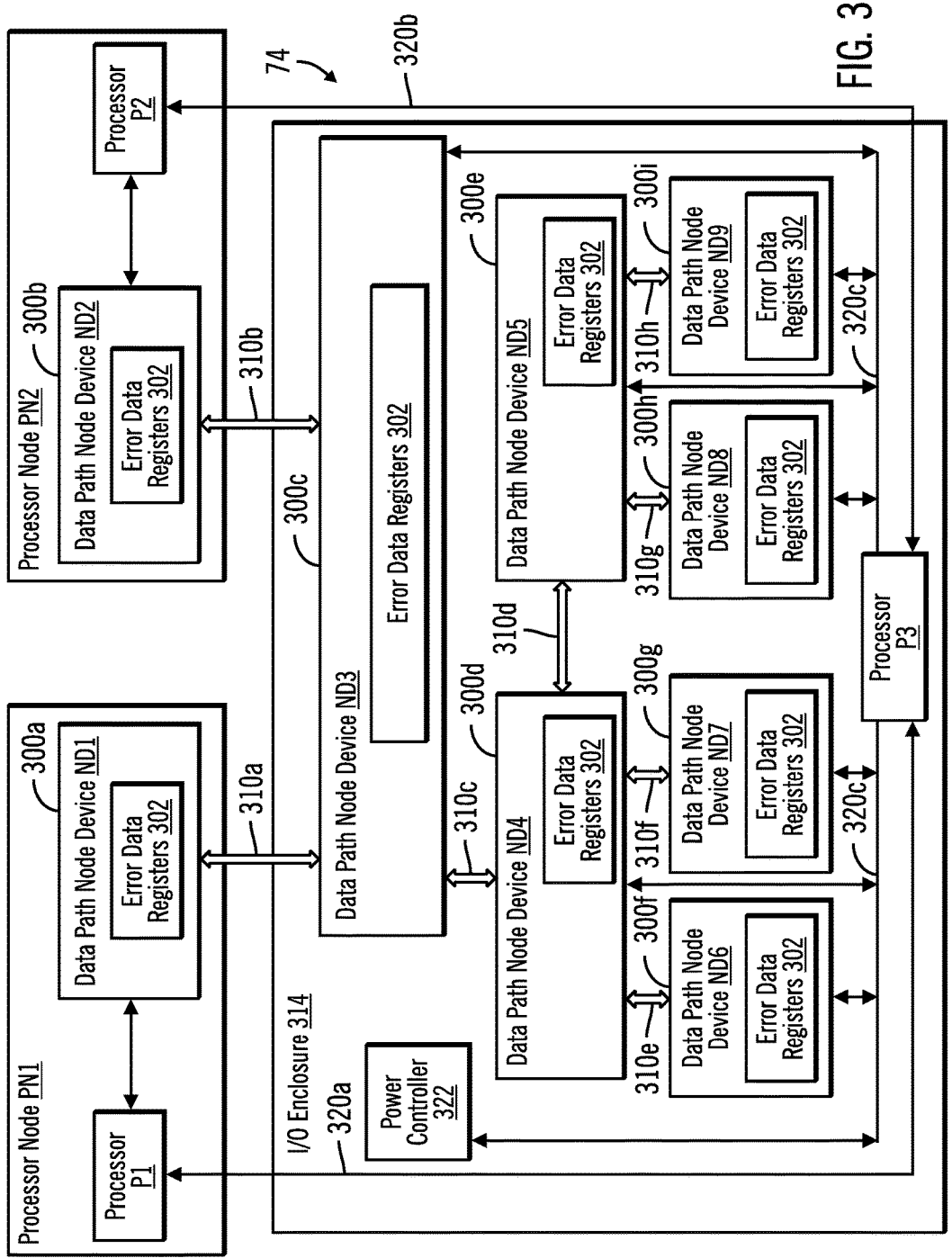
FIG. 3 depicts an embodiment of a connection fabric employing multiple path error data collection in accordance with the present description.

For example, in the illustrated embodiment, FIG. 3 shows the connection fabric 74 having a plurality of data paths arranged in a hierarchy of data path levels. Each hierarchical data path level includes a data path node 300a, 300b . . . 300i. Each hierarchical data path node 300a, 300b . . . 300i includes a main data path node device ND1, ND2 . . . ND9, respectively, configured to store in suitable registers 302, error data associated with an error condition in the main data paths. Thus, the hierarchical data path node 300a, for example, includes a main data path node device ND1 configured to store in data error registers 302, error data associated with an error condition in a data path in communication with the hierarchical data path node 300a of the main data path node device ND1. Although the embodiment of FIG. 3 depicts nine hierarchical data path nodes with a main data path node device in each node, it is appreciated that the number of main data path nodes and main data path node devices may be greater or fewer in number, depending upon the particular application.

The connection fabric 74 further includes a plurality of main data path links 310a, 310b . . . 310h which interconnect the hierarchical data path nodes 300a, 300b . . . 300i. For example, the data path link 310a couples the data path nodes 300a and 300c. In the illustrated embodiment, the data path nodes 300a, 300b . . . 300i and the interconnecting data path links 310a, 310b . . . 310h conform to the PCIe protocol and are high speed, high volume devices. It is appreciated that the data path nodes and links may be other types of data transmission devices, depending upon the particular application.

Figure 4:
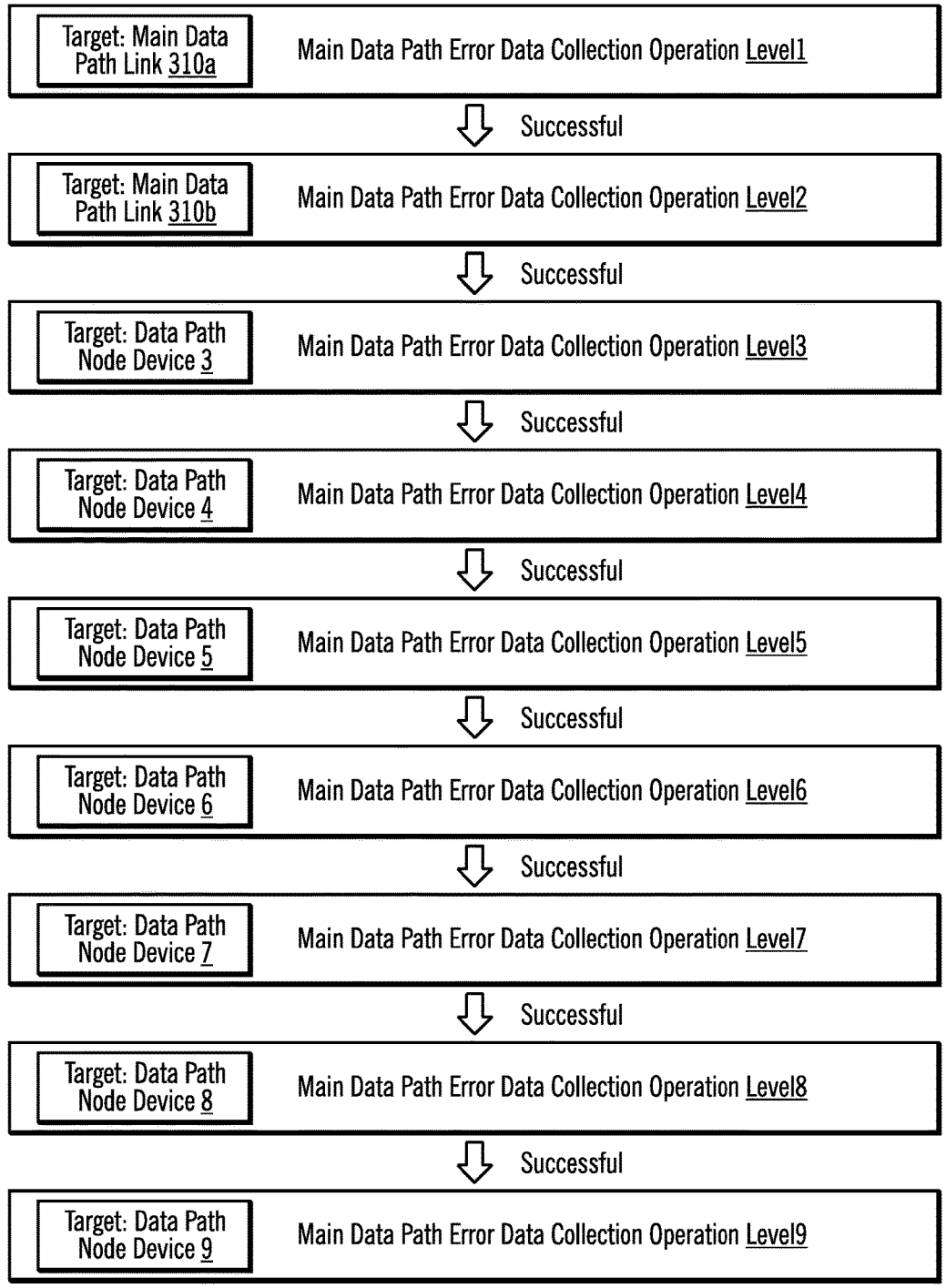
FIG. 4 depicts an embodiment of a sequence of main data path error data collection operations arranged in a hierarchy of error data collection levels, in accordance with the present description.

In the illustrated embodiment, the main data path error data collection operation at each level of the sequence of main data path error data collection operations initiated (block 226, FIG. 2) in response to detection (block 222) of an error condition in a main data path, includes collecting error data stored in a main data path node device of the hierarchical data path level associated with the operation level of the sequence of main data path error data collection operations. FIG. 4 shows an example of a hierarchical arrangement of sequential main data path error data collection operation levels, level1, level2 . . . level9, each of which is associated with a hierarchical data path level of the connection fabric 74 of FIG. 3. In one embodiment, the main data path collection operation of each level, level1, level2 . . . level9, targets one or more data path node or link devices of the hierarchical data path levels which include the data path nodes 300a, 300b . . . 300i (FIG. 3), and links 310a, 310b . . . 310h, respectively. Accordingly, the main data path error data collection operation of each sequential operation level collects, if successful, through the main data path, error data stored in a main data path node device (such as one of the data path node devices ND1, ND2 . . . ND9, for example,) associated with a detected error condition.

The sequential main data path error data collection operation levels level1, level2 . . . level9 are depicted in FIG. 4 in a sequential order of execution. Thus, the main data path error data collection operation of level2 is performed after the main data path error data collection operation of level1, the main data path error data collection operation of level3 is performed after the main data path error data collection operation of level2, and so on. The main data path error data collection operation of main data path error data collection level9 is performed last in this embodiment. It is appreciated that the particular order of sequence may vary. It is further appreciated that multiple path error data collection in accordance with the present description may be performed with more levels or fewer levels of sequential error data collection levels depending upon the particular application. It is further appreciated that the number of main data path devices associated with any one sequential error data collection operation level may vary, depending upon the particular application.

Upon initiation (block 226, FIG. 2) of the sequence of main data path error data collection operations through the main data path, a determination (block 230) is made as to whether the particular main data path error data collection operation of the main data path error data collection operation level in sequence, was successful. Each main data path error data collection operation targets a particular main data path level device to collect the error data. As shown in the embodiment of FIG. 4, the first main data path error data collection operation in sequence is the main data path error data collection operation of Level1 which targets the main data path link 310a. As shown in the embodiment of FIG. 3, a first processor node PN1 of the storage controller 58 (FIG. 1) includes a first processor P1 and the main data path node device ND1 coupled by the PCIe link 310a to the main data path node device ND3 of an I/O enclosure 314. In response to the detection (block 222, FIG. 2) of the error condition in the main data path, the first error data collection operation in sequence, that is, the main data path error data collection operation of Level1 (FIG. 4) tests the main data path link 310a by, for example, attempting to contact (block 226, FIG. 2) the main data path node device ND3 to collect error data stored in the registers 302 of the main data path node device ND3. If the error data collection operation of that level is determined (block 230, FIG. 2) to be successful, that is, error data was successfully collected from the registers 302 of the main data path node device ND3, a determination (block 234) is made as to whether there are additional levels of the sequential main data path error data collection operations to be performed. If so, the next error data collection operation in sequence, that is, the main data path error data collection operation of Level2 (FIG. 4) tests the main data path link 310b by, for example, attempting (block 238, FIG. 2) to contact the main data path node device ND3 but via the main data path link 310b instead of the main data path link 310a, to collect error data stored in the registers 302 of the main data path node device ND3.

Conversely, if the main data path error data collection operation of Level1 is determined (block 230, FIG. 2) to have not been successful, the level at which the main data path error data collection operation failed is noted (block 248), and an attempt is made (block 252) to collect error data through an alternate data path at a corresponding alternate data path error data collection operation level. In this manner, the particular error data to be collected through an alternate data path is determined as a function of the error data collection level at which the failure occurred.

Figure 5A:
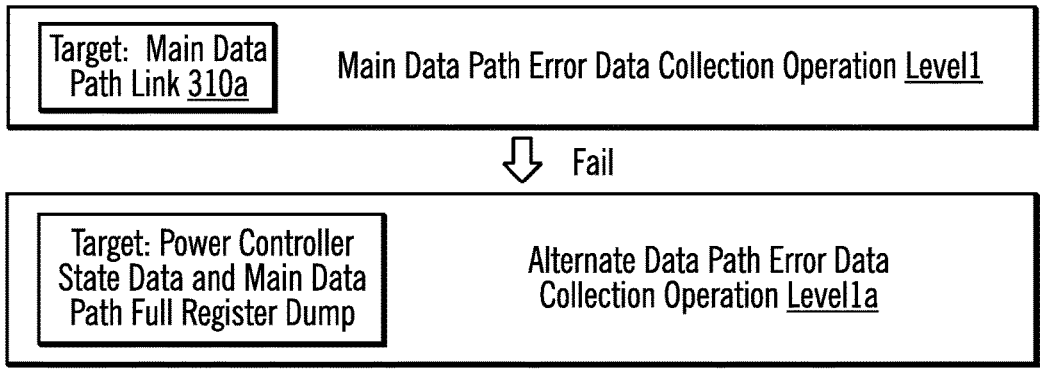
FIGS. 5a-5i depict levels of alternate data path error data collection operations, each alternate data path error data collection operation level corresponding to a level of a main data path collection level of the sequence of main data path error data collection operations of FIG. 4.

For example, as shown in FIGS. 5a-5i, each main data path error data collection operation level Level1-Level9 has a corresponding alternate data path error data collection operation level Level1a-Level9a, respectively. Thus, if the error data collection operation of Level1 is determined (block 230, FIG. 2) to have not been successful, the level Level1 at which the main data path error data collection operation failed is noted (block 248), and an alternate data path error data collection operation at a level Level1a (FIG. 5a) corresponding to the main data path error data collection operation Level1 is initiated (block 252), to collect error data through an alternate data path. As shown in FIG. 5a, the alternate data path error data collection operation of Level1a targets power controller state data and a full register dump.

In the illustrated embodiment, the connection fabric 74 includes in addition to the main data paths which may be PCIe data paths, for example, an alternate data path for the alternate data path error data collection operations of levels Level1a-Level 9a of FIGS. 5a-5i, respectively. In some embodiments, the alternate data paths may be utilized for somewhat restricted purposes rather than as general purpose data paths such as the main data paths. In accordance with the restricted purposes of some embodiments, the alternate data path for such restricted purposes may have, in some embodiment, a smaller and therefore more economical bandwidth than that of the main data path. One example of such an alternate data path is an RS 485 data path which in some applications, may be implemented more economically than a redundant main data path such as a high transfer rate, high data volume redundant PCIe data path, for example.

In the example of FIG. 3, the alternate data path includes an RS 485 link 320a coupling the processor P1 of the processor node PN1 of the storage controller 58, to a processor P3 of the I/O enclosure 314. Similarly, the alternate data path includes an RS 485 link 320b coupling the processor P2 of the processor node PN2 of the storage controller 58, to the processor P3 of the I/O enclosure 314. Further, an alternate data path includes RS 485 links 320c coupling the processor P3 of the I/O enclosure 314 to each of the main data path node devices ND3-ND9, of the nodes 300c-300i, respectively, and to the power controller 322 of the I/O enclosure 314. As explained in greater detail below, the processor P3 may respond to data requests of the storage controller 58 to collect error data over alternate data paths in the event of a failure of an error data collection operation over the main data paths.

For example, if the main data path error data collection operation of Level1 is determined (block 230, FIG. 2) to have not been successful, the cause of the failure of the main data path error data collection operation of Level1 is likely an error condition of the PCIe link 310a (FIG. 3) or the main data path node device ND3. Also, the detected (block 222) error condition may in turn have a variety of possible causes including a full or partial power failure of the I/O enclosure 314, a full or partial hardware or software failure of the PCIe link 310, or a full or partial hardware or software failure of the main data path node device ND3, or a combination thereof. Accordingly, to facilitate diagnosing the cause of the error condition which lead to the failure of the main data path error data collection operation of Level1 as well as the detected (block 222) error condition, the alternate data path error data collection operation of Level1a (FIG. 5a) which corresponds to the main data path error data collection operation of Level1, includes collecting over the alternate data paths in this embodiment, state data of the power controller 322 and a full register dump of the PCIe data path node devices as shown in FIG. 5*a*. Thus, in this example, the particular error data to be collected that is, the power controller state data and a full register dump from one or more of the data path node devices, are determined as a function of the level (Level1, in this example), at which the error data collection operation failed.

In accordance with the alternate data path error data collection operation of Level1*a*, in response to a request by the processor P1 of the storage controller 58, over the alternate data path link 320*a*, the processor P3 of the I/O enclosure 314 queries the power controller 322 over the alternate data path 320*c* to read and obtain the state data for the power controller 322. In addition, in response to a request by the processor P1 of the storage controller 58, over the alternate data path link 320*a*, the processor P3 of the I/O enclosure 314 queries the appropriate main data path node devices of the I/O enclosure over the alternate data path 320*c* to read and obtain the full register dump. In some embodiments, a full register dump may be obtained by querying each of the main data path node devices ND3-ND9 and collecting the error data stored in the associated registers 302 of the main data path node devices ND3-ND9. It is appreciated that in other embodiments, a full register dump may be obtained by querying some but not all of the main data path node devices ND3-ND9 and collecting the error data stored in the associated registers 302 of the selected main data path node devices ND3-ND9. It is further appreciated that in other embodiments, the alternate data path error data collection operation of Level1*a* (FIG. 5*a*) which corresponds to the main data path error data collection operation of Level1, may include collecting over the alternate data paths the error data stored in selected registers and selected main data path node devices and thus may constitute a less than full register dump. In this manner, the error data identified by the alternate data path error collection operation of Level1*a*, as a function of the level, Level1, at which the main data path error collection operation failed, is collected and may be forwarded to the storage controller 58 over an alternate data path.

As shown in the embodiment of FIG. 3, a second processor node PN2 of the storage controller 58 (FIG. 1) includes a second processor P2 and the main data path node device ND2 coupled by the PCIe link 310*b* to the main data path node device ND3 of the input/output (I/O) enclosure 314. As previously mentioned, if the main data path error data collection operation of Level1 (FIG. 4) is determined (block 230, FIG. 2) to be successful, that is, error data was successfully collected from the registers 302 of the main data path node device ND3, the next error data collection operation in sequence, that is, the main data path error data collection operation of Level2 (FIG. 4) tests the main data path link 310*b* by, for example, attempting (block 238, FIG. 2) to collect over the link 310*b*, error data stored in the registers 302 of the main data path node device ND3.

If the error data collection operation of Level2 is determined (block 230, FIG. 2) to have not been successful, the level Level2 at which the main data path error data collection operation failed is noted (block 248), and an alternate data path error data collection operation at a level Level2*a* (FIG. 5*a*) corresponding to the main data path error data collection operation Level2 is initiated (block 252), to collect error data through an alternate data path. The error data to be collected over the alternate data paths is determined by the selection of the alternative data path error collection operation of Level2*a* which is selected as a function of the level (Level2 in this example) of the main data path error data collection operation which failed.

Figure 5B:
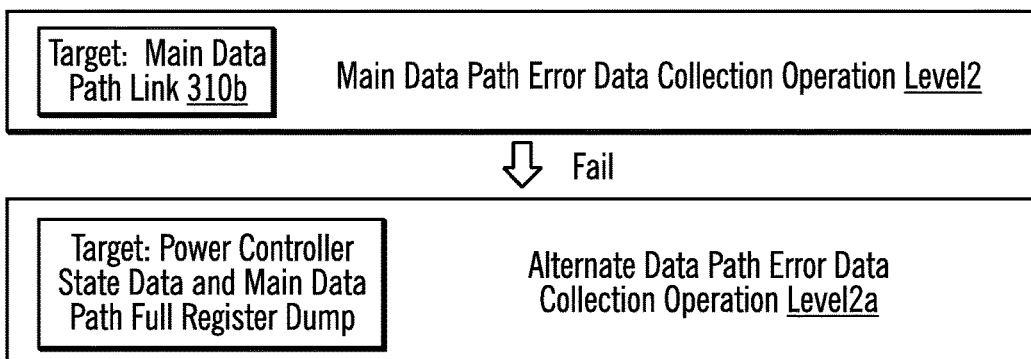

Here too, if the main data path error data collection operation of Level2 is determined (block 230, FIG. 2) to have not been successful, the cause of the failure of the main data path error data collection operation of Level2 is likely an error condition of the PCIe link 310*b* (FIG. 3) or the main data path node device ND3. The detected (block 222) error condition may in turn have a variety of possible causes including a full or partial power failure of the I/O enclosure 314, a full or partial hardware or software failure of the PCIe link 310*b*, or a full or partial hardware or software failure of the main data path node device ND3, or a combination thereof. Accordingly, the alternate data path error data collection operation of Level2*a* (FIG. 5*a*) which corresponds to the main data path error data collection operation of Level2, includes collecting over the alternate data paths in this embodiment, state data for the power controller and a full register dump as shown in FIG. 5*b*.

Accordingly, in response to a request by the processor P2 of the storage controller 58, over the alternate data path link 320*b*, the processor P3 of the I/O enclosure 314 queries the power controller 322 over the alternate data path link 320*c* to read and obtain the power controller state data. Further, in response to a request by the processor P2 of the storage controller 58, over the alternate data path link 320*b*, the processor P3 of the I/O enclosure 314 queries the appropriate main data path node devices of the I/O enclosure to read and obtain the full register dump. The error data collected in the alternate data path error collection operation of Level2*a* may be forwarded to the storage controller 58.

As set forth above, in some embodiments, a full register dump may be obtained by querying each of the main data path node devices ND3-ND9 and collecting the error data stored in the associated registers 302 of the main data path node devices ND3-ND9. It is appreciated that in other embodiments, a full register dump may be obtained by querying some but not all of the main data path node devices ND3-ND9 and collecting the error data stored in the associated registers 302 of the selected main data path node devices ND3-ND9. It is further appreciated that in other embodiments, the alternate data path error data collection operation of Level2*a* (FIG. 5*a*) which corresponds to the main data path error data collection operation of Level2, may include collecting over the alternate data paths the error data stored in selected devices, selected registers and selected main data path node devices and thus may constitute a less than full register dump.

If the main data path error data collection operation of Level2 (FIG. 4) is determined (block 230, FIG. 2) to be successful, that is, error data was successfully collected over the link 310*b* from the registers 302 of the main data path node device ND3, the next main data path error data collection operation in sequence, that is, the main data path error data collection operation of Level3 (FIG. 4) targets the main data path node device ND3 and thus attempts (block 238, FIG. 2) to collect the error data stored in the registers 302 of the main data path node device ND3.

If the error data collection operation of Level3 is determined (block 230, FIG. 2) to have not been successful, the level Level3 at which the main data path error data collection operation failed is noted (block 248), and an alternate data path error data collection operation at a level Level3*a* (FIG. 5*c*) corresponding to the main data path error data collection operation Level3 is initiated (block 252), to collect error data through an alternate data path.

Figure 5C:
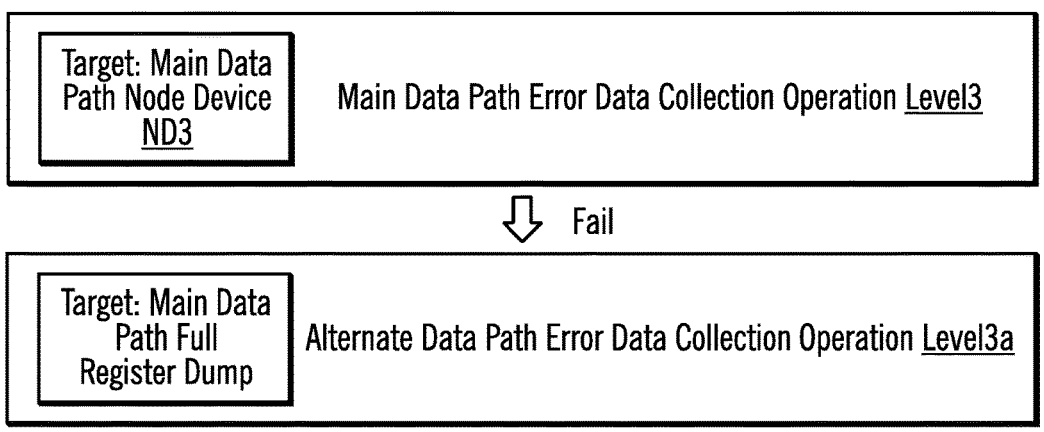

If the main data path error data collection operation of Level3 is determined (block 230, FIG. 2) to have not been successful, the cause of the failure of the main data path error data collection operation of Level1 is likely an error condition of one of the main data path node devices ND3-ND9 instead of the main data path links 310a, 310b or the power controller 322 since main data path links 310a, 310b were successfully tested as described above. Accordingly, the error condition is likely a full or partial hardware or software failure of one or more of the main data path node devices ND3-ND9, or a combination thereof. Accordingly, the alternate data path error data collection operation of Level3a (FIG. 5a) which corresponds to the main data path error data collection operation of Level3, includes collecting over the alternate data paths in this embodiment, a full register dump of the main data path node devices as shown in FIG. 5c.

Accordingly, in response to a request by the processor P2 of the storage controller 58, over the alternate data path link 320b, the processor P3 of the I/O enclosure 314 queries the appropriate main data path node devices of the I/O enclosure to obtain the full register dump. In some embodiments, a full register dump may be obtained by querying each of the main data path node devices ND3-ND9 and collecting the error data stored in the associated registers 302 of the main data path node devices ND3-ND9. It is appreciated that in other embodiments, a full register dump may be obtained by querying some but not all of the main data path node devices ND3-ND9 and collecting the error data stored in the associated registers 302 of the selected main data path node devices ND3-ND9. It is further appreciated that in other embodiments, the alternate data path error data collection operation of Level3a (FIG. 5c) which corresponds to the main data path error data collection operation of Level3, may include collecting over the alternate data paths the error data stored in selected registers and selected main data path node devices and thus may constitute a less than full register dump.

If the main data path error data collection operation of Level3 (FIG. 4) is determined (block 230, FIG. 2) to be successful, that is, error data was successfully collected from the registers 302 of the main data path node device ND3, the next error data collection operation in sequence, that is, the main data path error data collection operation of Level4 (FIG. 4) targets the main data path node device ND4 and thus attempts (block 238, FIG. 2) to collect the error data stored in the registers 302 of the main data path node device ND4.

If the main data path error data collection operation of Level4 is determined (block 230, FIG. 2) to have not been successful, the level Level4 at which the main data path error data collection operation failed is noted (block 248), and an alternate data path error data collection operation at a level Level4a (FIG. 5d) corresponding to the main data path error data collection operation Level4 is initiated (block 252), to collect error data through an alternate data path.

Figure 5D:
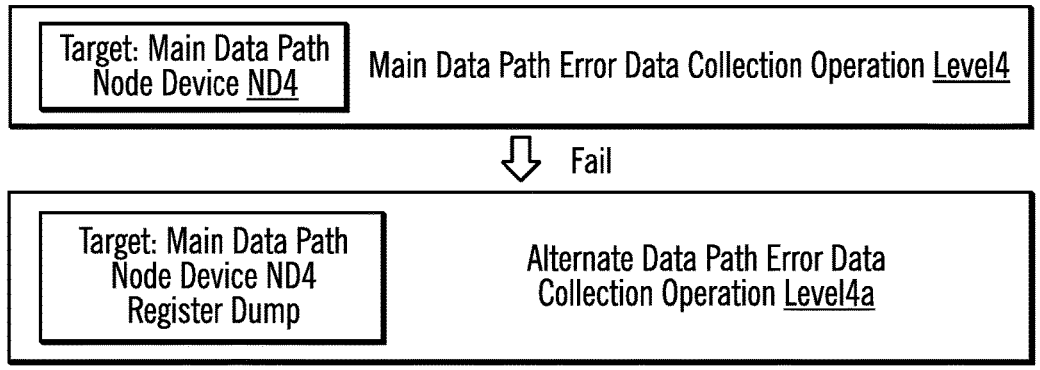

If the main data path error data collection operation of Level4 is determined (block 230, FIG. 2) to have not been successful, the cause of the failure of the main data path error data collection operation of Level4 is likely an error condition of a particular main data path device, that is the, the main data path node device ND4 of the main data path node 600d instead of, for example, the main data path node device ND3, or the main data path links 310a, 310b 310c or the power controller 322 since these were success- fully tested as described above. Accordingly, the error condition is likely a full or partial hardware or software failure of the particular main data path node device ND4 or the link 310c associated with the main data path operation level Level4. Accordingly, the alternate data path error data collection operation of Level4a (FIG. 5d) which corresponds to the main data path error data collection operation of Level4, includes collecting over the alternate data paths in this embodiment, a register dump of the main data path node device ND4 of the node 300d as shown in FIG. 5d. In this manner, the error data to be collected over an alternate data path is determined as a function of the level at which the sequence of main data path error data collection operations failed.

Accordingly, in response to a request by a processor of the storage controller 58, over an alternate data path link 320a, 320b, the processor P3 of the I/O enclosure 314 queries the main data path node device ND4 of the I/O enclosure to obtain the register dump of the main data path node device ND4 of the node 300d over the alternate data path link 320c. In some embodiments, a register dump may be obtained by querying additional main data path node devices ND3-ND9 and collecting the error data stored in the associated registers 302 of the additional main data path node devices ND3-ND9.

If the main data path error data collection operation of Level4 (FIG. 4) is determined (block 230, FIG. 2) to be successful, that is, error data was successfully collected from the registers 302 of the main data path node device ND4, the next error data collection operation in sequence, that is, the main data path error data collection operation of Level5 (FIG. 4) targets the main data path node device ND5 and thus attempts (block 238, FIG. 2) to collect the error data stored in the registers 302 of the main data path node device ND5.

If the main data path error data collection operation of Level5 is determined (block 230, FIG. 2) to have not been successful, the level Level5 at which the main data path error data collection operation failed is noted (block 248), and an alternate data path error data collection operation at a level Level5a (FIG. 5e) corresponding to the main data path error data collection operation Level4 is initiated (block 252), to collect error data through an alternate data path.

Figure 5E:
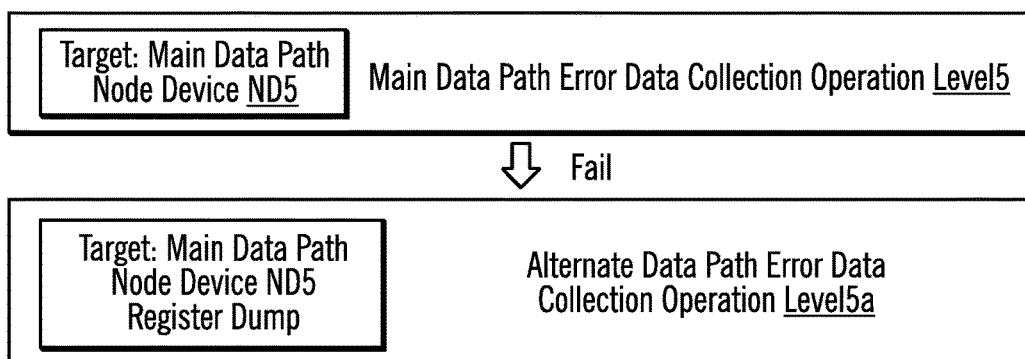
Figure 5F:
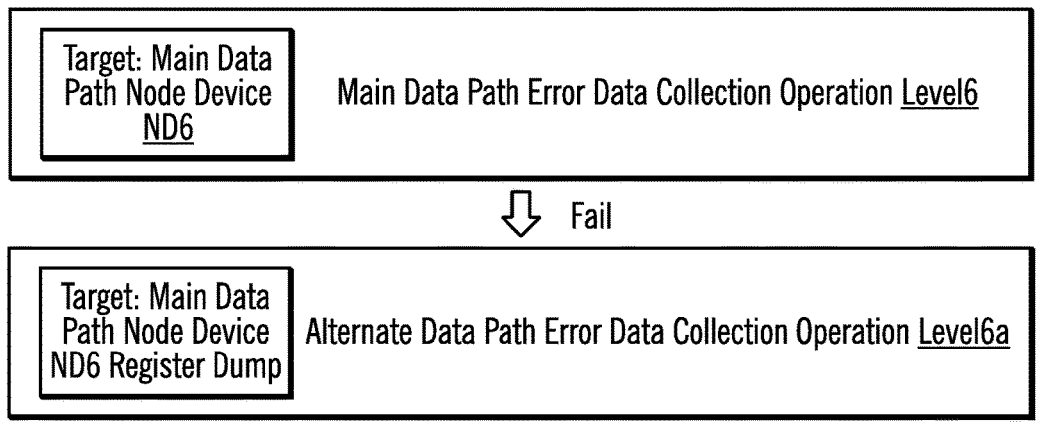
Figure 5G:
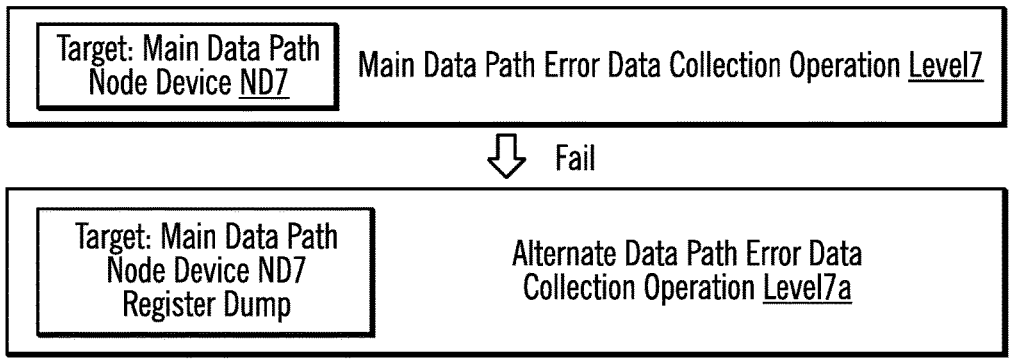
Figure 5H:
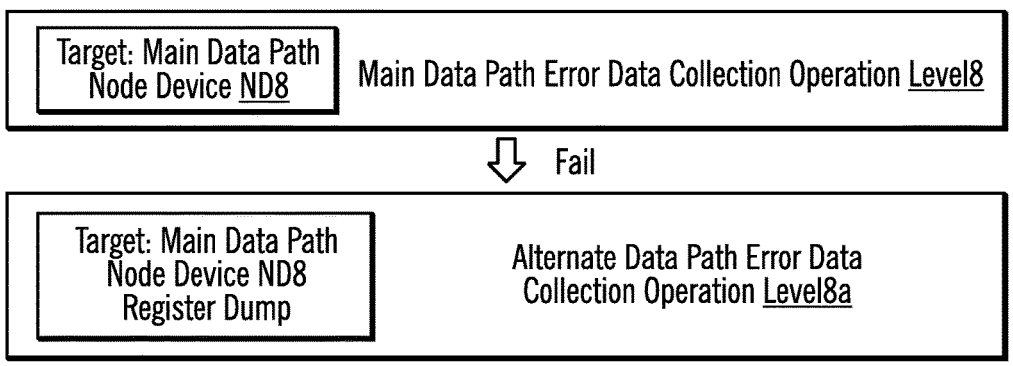
Figure 5I:
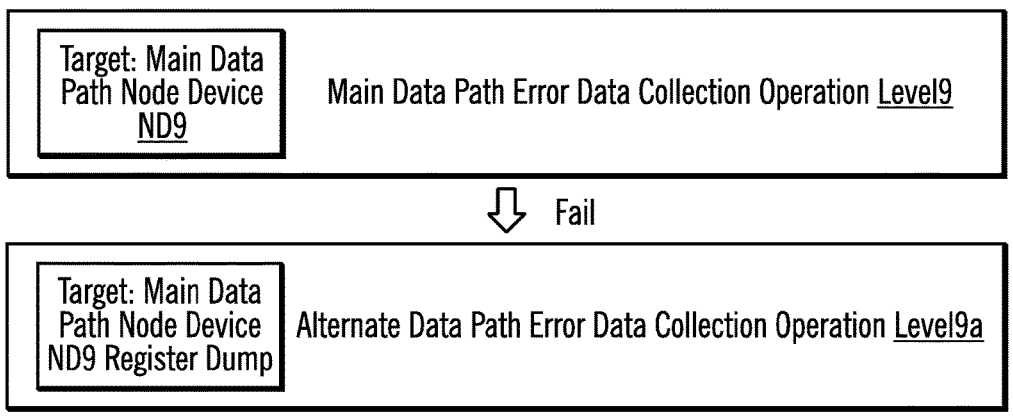

If the main data path error data collection operation of Level5 is determined (block 230, FIG. 2) to have not been successful, the cause of the failure of the main data path error data collection operation of Level5 is likely an error condition of a particular main data path device, that is the, the main data path node device ND5 of the main data path node 300e or the link 310d instead of, for example, the main data path node device ND3, ND4, the main data path links 310a, 310b, 310c or the power controller 322 since these were successfully tested as described above. Accordingly, the error condition is likely a full or partial hardware or software failure of the particular main data path node device ND5 associated with the main data path operation level Level5. Accordingly, the alternate data path error data collection operation of Level5a (FIG. 5e) which corresponds to the main data path error data collection operation of Level5, includes collecting over the alternate data paths in this embodiment, a register dump of the main data path node device ND5 of the node 300e as shown in FIG. 5e. In this manner, the error data to be collected over an alternate data path is determined as a function of the level at which the sequence of main data path error data collection operations failed.

Accordingly, in response to a request by a processor of the storage controller 58, over an alternate data path link 320a, 320b, the processor P3 of the I/O enclosure 314 queries the main data path node device ND5 of the I/O enclosure to obtain the register dump of the main data path node device ND5 of the node 300e over the alternate data path link 320c. In some embodiments, a register dump may be obtained by querying additional main data path node devices ND3-ND9 and collecting the error data stored in the associated registers 302 of the additional main data path node devices ND3-ND9.

The main data path error data collection operations of levels Level6-Level9 operate in a similar manner. Thus, if the main data path error data collection operation of Level5 (FIG. 4) is determined (block 230, FIG. 2) to be successful, that is, error data was successfully collected from the registers 302 of the main data path node device ND5 over the link 310d, the next error data collection operation in sequence, that is, the main data path error data collection operation of Level6 (FIG. 4) targets the main data path node device ND6 and thus attempts (block 238, FIG. 2) to collect the error data stored in the registers 302 of the main data path node device ND6 over the link 310e.

Similarly, if the main data path error data collection operation of Level6 (FIG. 4) is determined (block 230, FIG. 2) to be successful, that is, error data was successfully collected from the registers 302 of the main data path node device ND6 over the link 310e, the next error data collection operation in sequence, that is, the main data path error data collection operation of Level7 (FIG. 4) targets the main data path node device ND7 and thus attempts (block 238, FIG. 2) to collect the error data stored in the registers 302 of the main data path node device ND7 over the link 310f. If the main data path error data collection operation of Level7 (FIG. 4) is determined (block 230, FIG. 2) to be successful, that is, error data was successfully collected from the registers 302 of the main data path node device ND7 over the link 310f, the next error data collection operation in sequence, that is, the main data path error data collection operation of Level8 (FIG. 4) targets the main data path node device ND8 and thus attempts (block 238, FIG. 2) to collect the error data stored in the registers 302 of the main data path node device ND8 over the link 310g. If the main data path error data collection operation of Level8 (FIG. 4) is determined (block 230, FIG. 2) to be successful, that is, error data was successfully collected from the registers 302 of the main data path node device ND8 over the link 310g, the next error data collection operation in sequence, that is, the main data path error data collection operation of Level9 (FIG. 4) targets the main data path node device ND9 and thus attempts (block 238, FIG. 2) to collect the error data stored in the registers 302 of the main data path node device ND9 over the link 310h.

If the main data path error data collection operation of Level6 is determined (block 230, FIG. 2) to have not been successful, the level Level6 at which the main data path error data collection operation failed is noted (block 248), and an alternate data path error data collection operation at a level Level6a (FIG. 5f) corresponding to the main data path error data collection operation Level6 is initiated (block 252), to collect error data from the main data path node device ND6 through an alternate data path. Similarly, if the main data path error data collection operation of Level7 is determined (block 230, FIG. 2) to have not been successful, the level Level7 at which the main data path error data collection operation failed is noted (block 248), and an alternate data path error data collection operation at a level Level7a (FIG. 5g) corresponding to the main data path error data collection operation Level7 is initiated (block 252), to collect error data from the main data path node device ND7 through an alternate data path.

If the main data path error data collection operation of Level8 is determined (block 230, FIG. 2) to have not been successful, the level Level8 at which the main data path error data collection operation failed is noted (block 248), and an alternate data path error data collection operation at a level Level8a (FIG. 5h) corresponding to the main data path error data collection operation Level8 is initiated (block 252), to collect error data from the main data path node device ND8 through an alternate data path. If the main data path error data collection operation of Level9 is determined (block 230, FIG. 2) to have not been successful, the level Level9 at which the main data path error data collection operation failed is noted (block 248), and an alternate data path error data collection operation at a level Level9a (FIG. 5i) corresponding to the main data path error data collection operation Level9 is initiated (block 252), to collect error data from the main data path node device ND9 through an alternate data path.

If any of the main data path error data collection operations of levels Level6-Level9 is determined (block 230, FIG. 2) to have not been successful, the cause of the failure of the main data path error data collection operation of that particular level is likely an error condition of a particular main data path node device, that is the, the main data path node device ND6-ND9, respectively, of the main data path nodes 300e-300i, respectively, or the associated link 310e-310f, respectively, of the particular data path level associated with the main data path error data collection level that failed, instead of, for example, the main data path node device ND3-ND5, the main data path links 310a-310d or the power controller 322 of the higher error data collection operation levels that succeeded, since these were successfully tested as described above. Accordingly, the detected (block 222) error condition is likely a full or partial hardware or software failure of the particular main data path node device ND6-ND9 (or the associated link 310e-310i, respectively) associated with the main data path operation level Level6-Level9, respectively. Accordingly, the alternate data path error data collection operation of Level6a-Level9a (FIGS. 5f-5i, respectively) which corresponds to the main data path error data collection operation of Level6-Level9, includes collecting over the alternate data paths in this embodiment, a register dump of the particular main data path node device ND6-ND9 of the node nodes 300e-300i, respectively, as shown in FIGS. 5f-5i, respectively. In this manner, the error data to be collected over an alternate data path is determined as a function of the level at which the sequence of main data path error data collection operations failed. Accordingly, in response to a request by a processor of the storage controller 58, over an alternate data path link 320a, 320b, the processor P3 of the I/O enclosure 314 queries the particular main data path node devices ND6-ND9 of the I/O enclosure to obtain the register dump of the particular main data path node device ND6-ND9 of the nodes 300e-300i, respectively, over the alternate data path links 320c, corresponding to the alternate data path error data collection operation, level Level6a-Level9a, respectively.

In one embodiment, the main data path node devices ND6-ND9 of the I/O enclosure may be various connection devices such as the host adapters HA1-HA2, device adapters DA1-DA2 for storage units such as disk drives or flash memory drives, for example, in which each adapter is received within a slot of the I/O enclosure 314. In some embodiments, a register dump may be obtained by querying additional main data path node devices ND3-ND9 and collecting the error data stored in the associated registers 302 of the additional main data path node devices ND3-ND9.

It is seen from the above, in one aspect of the present description, multiple data path error collection in accordance with the present description can facilitate error data collection notwithstanding the failure of data collection operations over the main data paths of the system. Moreover, determining which error data to collect as a function of the level of a sequence of main data path error data collection operations which failed, can facilitate use of smaller bandwidth alternate data paths. Other features and advantages may be realized, depending upon the particular application.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
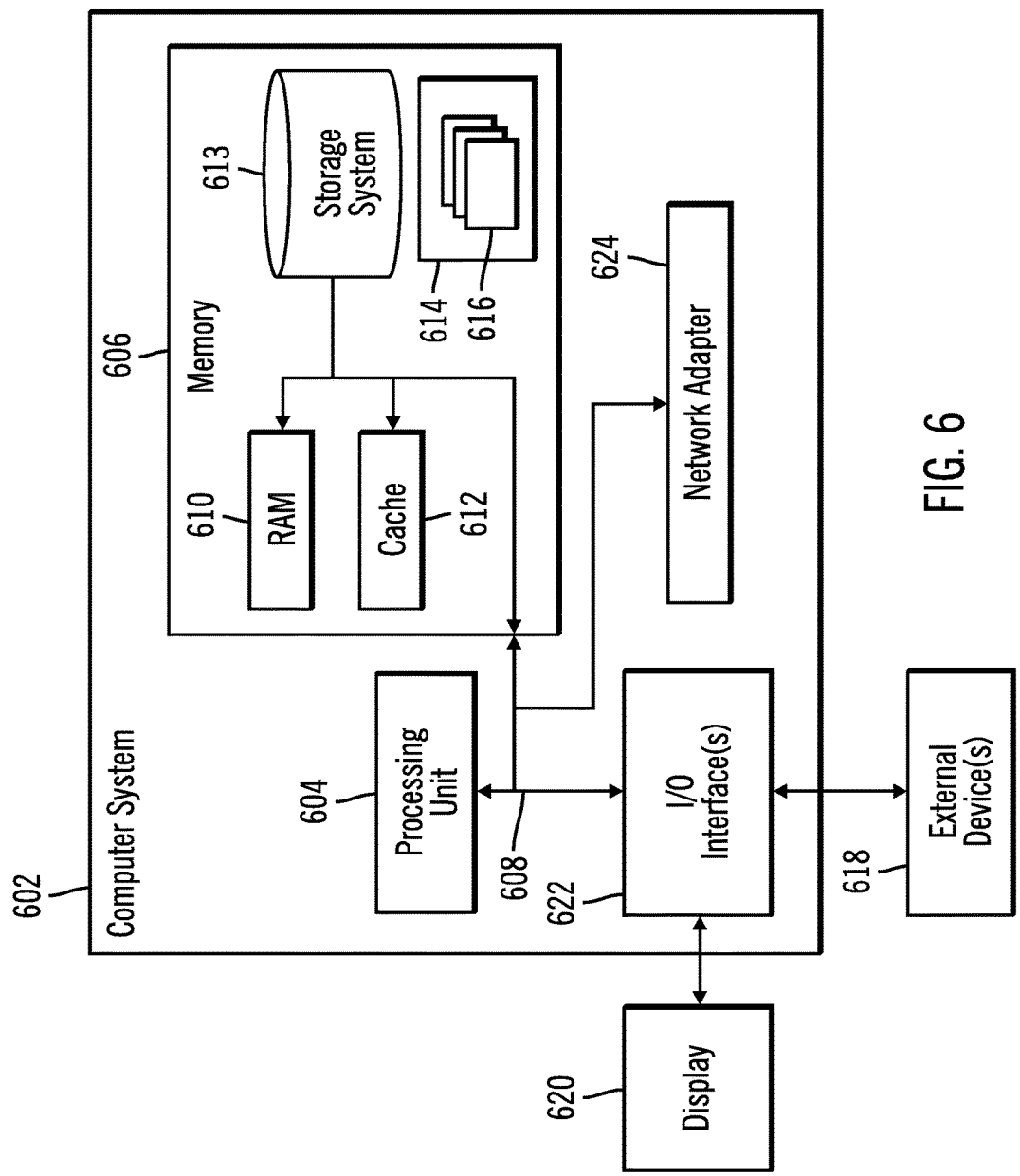
FIG. 6 illustrates an example of a computing environment in which components of FIG. 1 may be implemented.

The computational components of FIG. 1, including the hosts and server 42 may be implemented in one or more computer systems, such as the computer system 602 shown in FIG. 6. Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system/server 602 is shown in the form of a general-purpose computing device. The components of computer system/server 602 may include, but are not limited to, one or more processors or processing units 604, a system memory 606, and a bus 608 that couples various system components including system memory 606 to processor 604. Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. The components of the computer 602 may be implemented as program modules 616 which generally carry out the functions and/or methodologies of embodiments of the invention as described herein. The systems of FIG. 1a may be implemented in one or more computer systems 602, where if they are implemented in multiple computer systems 602, then the computer systems may communicate over a network.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

The reference characters used herein, such as i and n, are used herein to denote a variable number of instances of an element, which may represent the same or different values, and may represent the same or different value when used with different or the same elements in different described instances.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing a storage management system to manage data paths in a computing system having a host, a storage controller and a storage unit controlled by the storage controller wherein the storage controller is coupled to the host and storage unit by at least one main data path of a plurality of main data paths having a first protocol, and wherein the computer program product comprises a computer readable storage medium having program instructions embodied therewith, the program instructions executable by a processor of the storage management system to cause operations, the operations comprising:
   detecting an error condition in a main data path between the storage controller and at least one of a host and a storage unit;
   collecting error data collection through the main path in a sequence of hierarchical error data collection operations arranged in a hierarchy of a plurality of error data collection levels; and
   collecting error data through an alternate data path having a second protocol for lower data transfer rates as compared to that of the first protocol.

2. The computer program product of claim 1 wherein collecting error data collection through the main path includes sequentially attempting collecting error data collection through the main path in a sequence of hierarchical error data collection operations arranged in the hierarchy of the plurality of error data collection levels, wherein the plurality of main data paths are arranged in a hierarchy of data path levels, each hierarchical data path level including a data path node having a data path node device configured to store error data associated with the detected error condition and wherein the computing system includes a plurality of alternate data paths having the second protocol and coupling the storage controller to the data path node devices of hierarchical data path levels, wherein the collecting error data through an alternate data path includes in response to a failure to collect error data at a level of the sequential error data collection operations, collecting error data through an alternate data path having the second protocol as a function of the error data collection level at which the failure occurred, which includes determining which data path node device to collect error data from as a function of the error data collection level at which the failure occurred.

3. The computer program product of claim 2 wherein each level of the sequence of hierarchical error data collection operations is associated with a hierarchical data path level, and wherein the collecting error data through an alternate data path as a function of the error data collection level at which the failure occurred, includes collecting error data stored in the data path node device of the data path node of the hierarchical data path level associated with the level of the sequence of hierarchical error data collection operations at which the failure occurred.

4. The computer program product of claim 3 wherein the sequentially attempting error data collection through the main path in the sequence of hierarchical error data collection operations arranged in the hierarchy of a plurality of error data collection levels, includes attempting to collect error data through a main data path, from a first data path node device of a first data path node of a first hierarchical data path level, in a first level of the sequence of hierarchical error data collection operations, and in response to successfully collecting error data at the first level of the sequence of hierarchical error data collection operations, attempting to collect error data through a main data path, from a second data path node device of a second data path of a second hierarchical data path level, in a second level of the sequence of hierarchical error data collection operations.

5. The computer program product of claim 4 wherein the collecting error data through an alternate data path as a function of the error data collection level at which the failure occurred includes, in response to a failure to collect error data at the second level of the sequence of hierarchical error data collection operations, collecting error data through an alternate data path, from the second data path node device of the second data path node of the second hierarchical data path level.

6. The computer program product of claim 5 wherein the second data path node device has error data registers configured to store error data associated with the detected error condition, the computing system includes a data path processor associated with each data path node device of the hierarchical data path levels, and wherein alternate data paths couple the storage controller to the data path processor, and wherein the collecting error data through an alternate data path, from the second data path node device of the second data path node of the second hierarchical data path level includes the storage controller transmitting a data request over an alternate data path to the data path processor associated with the second path node device, the data path processor reading error data registers of the second data path node device, and forwarding the register error data to the storage controller.

7. The computer program product of claim 1 wherein the first protocol of a main data path is a Peripheral Component Interface Express (PCIe) protocol and wherein the second protocol of an alternate data path is an RS 485 protocol.

8. A computing system for use with a host and at least one storage unit having storage volumes, comprising:
   a server having a storage controller, a plurality of main data paths having a first protocol and coupling the storage controller to the host and the storage unit, and a plurality of alternate data paths having a second protocol for lower data transfer rates as compared to that of the first protocol and coupling the storage controller to main data paths, the storage controller having a storage management system having at least one processor and a computer program product, the storage management system being configurable to control the at least one storage unit, the main data paths and the alternate data paths wherein the computer program product comprises a computer readable storage medium having program instructions embodied therewith, the program instructions executable by a processor of the storage management system to cause operations, the operations comprising:
- detecting an error condition in a main data path between the storage controller and at least one of a host and a storage unit;
- collecting error data collection through the main path in a sequence of hierarchical error data collection operations arranged in a hierarchy of a plurality of error data collection levels; and
- collecting error data through an alternate data path having the second protocol as.

9. The computing system of claim 8 wherein collecting error data collection through the main path includes sequentially attempting collecting error data collection through the main path in a sequence of hierarchical error data collection operations arranged in the hierarchy of the plurality of error data collection levels, wherein the plurality of main data paths are arranged in a hierarchy of data path levels, each hierarchical data path level including a data path node having a data path node device configured to store error data associated with the detected error condition, wherein the plurality of alternate data paths couple the storage controller to the data path node devices of hierarchical data path levels, and wherein the collecting error data through an alternate data path includes in response to a failure to collect error data at a level of the sequential error data collection operations, collecting error data through an alternate data path having the second protocol as a function of the error data collection level at which the failure occurred, which includes determining which data path node device to collect error data from as a function of the error data collection level at which the failure occurred.

10. The computing system of claim 9 wherein each level of the sequence of hierarchical error data collection operations is associated with a hierarchical data path level, and wherein the collecting error data through an alternate data path as a function of the error data collection level at which the failure occurred, includes collecting error data stored in the data path node device of the data path node of the hierarchical data path level associated with the level of the sequence of hierarchical error data collection operations at which the failure occurred.

11. The computing system of claim 10 wherein the sequentially attempting error data collection through the main path in the sequence of hierarchical error data collection operations arranged in the hierarchy of a plurality of error data collection levels, includes attempting to collect error data through a main data path, from a first data path node device of a first data path node of a first hierarchical data path level, in a first level of the sequence of hierarchical error data collection operations, and in response to successfully collecting error data at the first level of the sequence of hierarchical error data collection operations, attempting to collect error data through a main data path, from a second data path node device of a second data path of a second hierarchical data path level, in a second level of the sequence of hierarchical error data collection operations.

12. The computing system of claim 11 wherein the collecting error data through an alternate data path as a function of the error data collection level at which the failure occurred includes, in response to a failure to collect error data at the second level of the sequence of hierarchical error data collection operations, collecting error data through an alternate data path, from the second data path node device of the second data path node of the second hierarchical data path level.

13. The computing system of claim 12 wherein the second data path node device has error data registers configured to store error data associated with the detected error condition, the server further includes a processor associated with each data path node device of the hierarchical data path levels, and wherein alternate data paths couple the storage controller to the data path processor, and wherein the collecting error data through an alternate data path, from the second data path node device of the second data path node of the second hierarchical data path level includes the storage controller transmitting a data request over an alternate data path to the data path processor associated with the second path node device, the data path processor reading error data registers of the second data path node device, and forwarding the register error data to the storage controller.

14. The computing system of claim 8 wherein the first protocol of a main data path is a Peripheral Component Interface Express (PCIe) protocol and wherein the second protocol of an alternate data path is an RS 485 protocol.

15. A method, comprising:
- detecting an error condition in a main data path between a storage controller and at least one of a host and a storage unit wherein the main data path has a first protocol;
- collecting error data collection through a main path in a sequence of hierarchical error data collection operations arranged in a hierarchy of a plurality of error data collection levels; and
- collecting error data through an alternate data path having a second protocol for lower data transfer rates as compared to that of the first protocol.

16. The method of claim 15 wherein collecting error data collection through the main path includes sequentially attempting collecting error data collection through the main path in a sequence of hierarchical error data collection operations arranged in the hierarchy of the plurality of error data collection levels, wherein a plurality of main data paths are arranged in a hierarchy of data path levels, each hierarchical data path level including a data path node having a data path node device configured to store error data associated with the detected error condition, wherein a plurality of alternate data paths having the second protocol couple the storage controller to the data path node devices of hierarchical data path levels, and wherein the collecting error data through an alternate data path includes in response to a failure to collect error data at a level of the sequential error data collection operations, collecting error data through an alternate data path having the second protocol as a function of the error data collection level at which the failure occurred, which includes determining which data path node device to collect error data from as a function of the error data collection level at which the failure occurred.

17. The method of claim 16 wherein each level of the sequence of hierarchical error data collection operations is associated with a hierarchical data path level, and wherein the collecting error data through an alternate data path as a function of the error data collection level at which the failure occurred, includes collecting error data stored in the data path node device of the data path node of the hierarchical data path level associated with the level of the sequence of hierarchical error data collection operations at which the failure occurred.

18. The method of claim 17 wherein the sequentially attempting error data collection through the main path in the sequence of hierarchical error data collection operations arranged in the hierarchy of a plurality of error data collection levels, includes attempting to collect error data through a main data path, from a first data path node device of a first data path node of a first hierarchical data path level, in a first level of the sequence of hierarchical error data collection operations, and in response to successfully collecting error data at the first level of the sequence of hierarchical error data collection operations, attempting to collect error data through a main data path, from a second data path node device of a second data path of a second hierarchical data path level, in a second level of the sequence of hierarchical error data collection operations.

19. The method of claim 18 wherein the collecting error data through an alternate data path as a function of the error data collection level at which the failure occurred includes, in response to a failure to collect error data at the second level of the sequence of hierarchical error data collection operations, collecting error data through an alternate data path, from the second data path node device of the second data path node of the second hierarchical data path level.

20. The method of claim 19 wherein the second data path node device has error data registers configured to store error data associated with the detected error condition, the storage controller further includes a processor associated with each data path node device of the hierarchical data path levels, and wherein alternate data paths couple the storage controller to the data path processor, and wherein the collecting error data through an alternate data path, from the second data path node device of the second data path node of the second hierarchical data path level includes the storage controller transmitting a data request over an alternate data path to the data path processor associated with the second path node device, the data path processor reading error data registers of the second data path node device, and forwarding the register error data to the storage controller.

21. The method of claim 15 wherein the first protocol of a main data path is a Peripheral Component Interface Express (PCIe) protocol and wherein the second protocol of an alternate data path is an RS 485 protocol.

* * * * *